April 10, 1934.  J. W. B. BLACKMAN  1,953,920
PROTECTED CONCRETE STRUCTURE
Original Filed Jan. 20, 1932  2 Sheets-Sheet 1
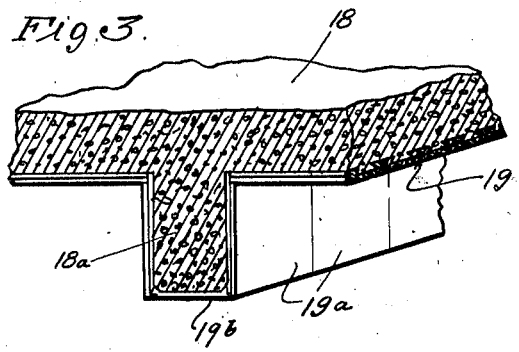
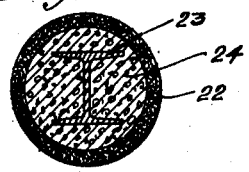
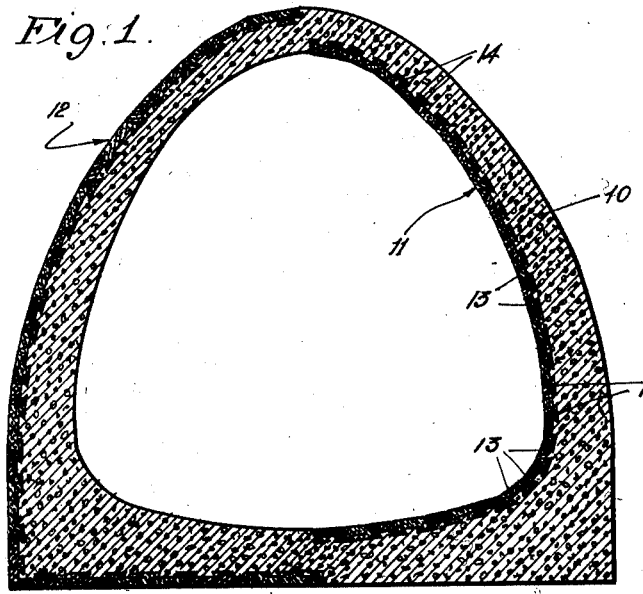
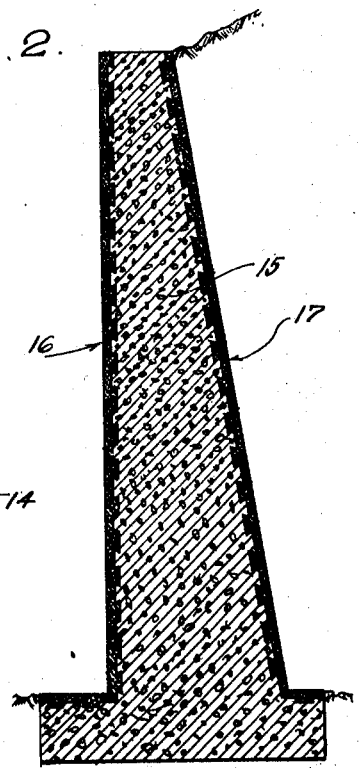
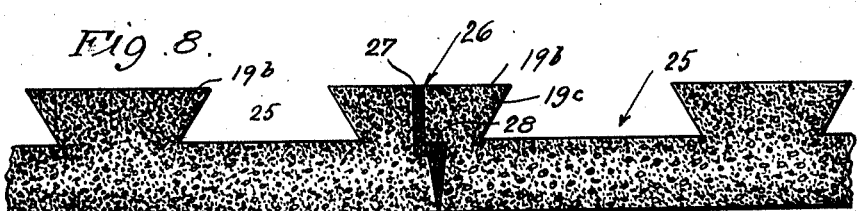
Inventor.
John W. B. Blackman.
Attorney.

April 10, 1934.   J. W. B. BLACKMAN   1,953,920
PROTECTED CONCRETE STRUCTURE
Original Filed Jan. 20, 1932    2 Sheets-Sheet 2
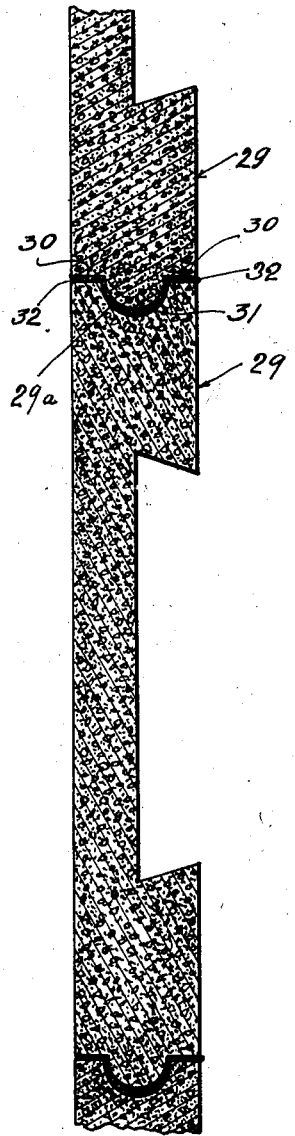
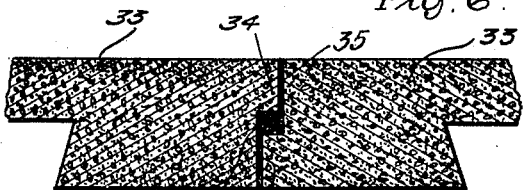
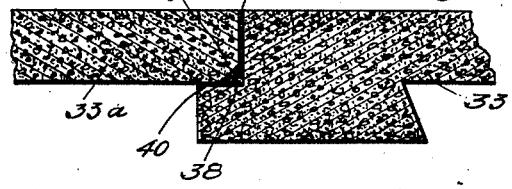
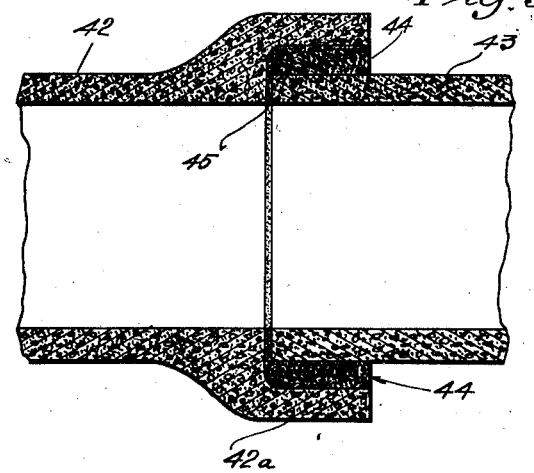
Inventor
John. W. B. Blackman
Attorney.

Patented Apr. 10, 1934

1,953,920

UNITED STATES PATENT OFFICE 1,953,920

PROTECTED CONCRETE STRUCTURE

John W. B. Blackman, Long Beach, Calif., assignor to Pan Pacific Piling and Construction Company, Los Angeles, Calif., a corporation of Delaware Application January 20, 1932, Serial No. 587,702
Renewed September 1, 1933

14 Claims. (Cl. 72—127)

This invention deals generally with protected concrete structures, and has for its principal object to prevent deterioration of concrete bodies as a result of the action of sea water, alkalies, acids and the like. It is to be understood that the invention is applicable to the protecting of concrete bodies in general, and under all circumstances where the concrete is subject to deterioration resulting from the action of agencies of the character named. The specific embodiments of the invention to which I later refer for purposes of description, are therefore to be regarded merely as typical of a wide variety of adaptions of which the invention is capable.

In accordance with the invention, those surfaces of a concrete body which normally would be subject to attack and resultant deterioration, may be protected by covering or attaching to them a preformed protective concrete surface layer, the concrete of which is so treated as to be waterproof and resistant to a wide variety of agencies known to have deteriorating effects upon concrete. In the broad aspects of the invention, the protective layer may be formed in a variety of manners in accordance with the nature of the concrete body to be protected. One preferred method of forming such layers, and one which is particularly satisfactory by virtue of its adaptability for protecting concrete bodies having a wide variety of shapes and forms, involves the one of preformed concrete slabs, impregnated with waterproofing material and so formed as to be capable of bonding to the main concrete body.

These protecteive surfacing slabs to which I refer, are formed of concrete having some degree of porosity, and preferably are so shaped as to provide projections or irregularities by means of which the slabs may be securely bonded to the body of concrete to which they are applied. Ordinarily, the slabs will be set up or arranged prior to pouring the concrete forming the body of the structure or wall, and in relative positions corresponding to the particular shape in which the structure is to be built. In other words these preformed concrete slabs may serve essentially as forms against which the concrete forming the body of the structure is poured. By virtue of the irregularities in the shapes of the slabs, a strong bond is effected between the slabs and the concrete poured against them, after the concrete has set and hardened.

As stated, the concrete slabs are first rendered waterproof and resistent to alkalies, acids and the like, by filling the pores in the concrete, with a material capable of giving to the slabs these properties. Preferably the slabs are impregnated with a bitumastic compound or asphalt under such conditions that the asphalt not only coats the slabs, but also penetrates them to a substantial depth. And in cases where the thickness of the slabs is not excessive, the penetration may be to such depths that the slabs may be said to be asphalt-impregnated throughout. In this connection, I may state that the slabs may be effectively impregnated according to the process described in Letters Patent No. 1,383,749, granted July 5, 1921 to Raymond G. Osborne on Process of treating concrete or the like.

Another feature of the invention resides in the provision of an improved type of joint for bonding together preformed concrete members which have been impregnated with asphalt or the like. My improved joint may be characterized principally in that it has a capacity equal to that of the slabs for resisting the action of deteriorating agents, and further in that it affords a bond of great strength between the members. The joint material, that is the substance with which the spaces between the joint members are filled, is of a nature such that it has bonding affinity for the material with which the slabs are impregnated, and preferably the joint substance will be of the same nature. When the joint is poured, the impregnating substance in the pores of the concrete members at the joint surfaces becomes melted sufficiently to combine with the joint material, with the result that the condition of the latter upon hardening is one of intimate combination and association with the impregnating substance in the members. In fact, the joint material may itself impregnate the members to a certain extent. The result had by forming the joints in this manner is that the bonds formed between the slab members are of extremely great strength. And as will readily appear, the advantages gained, reside not only in giving strength to the joints themselves, but to the structure as a whole. I may also state that by combining the joint material with a similar material with which the concrete joint members are impregnated, a joint is formed which not only prevents moisture leaking through, but also prevents roots working their way into the structure. This becomes a very important factor in such structures as sewer pipes.

I preferably utilize a joint material comprising a low penetration asphalt, and it is found that a particularly good strong joint is had where asphalt having a penetration of zero to ten at 77° F. is used. I may also add to the low penetration asphalt, a suitable percentage of siliceous material or other material capable of adding strength and body to the asphalt when hardened. Ordinarily, the siliceous material will comprise from 5% to 25% by volume or weight of the asphalt. The temperature of the joint asphalt at the time it is poured preferably will be substantially above the melting point of the asphalt with which the members are impregnated, and usually at a temperature between 225° and 350° F. Upon cooling, of course, the asphalt in the joint returns to its normal low penetration.

The invention further contemplates the provision of impregnated slabs or members shaped at their joint edges in such manners as to facilitate complete filling of the joints with asphalt. As will hereinafter appear, these joint edges may be given different shapes according to whether the joint extends along vertical or horizontal edges of the members.

The above mentioned objects and characteristics of the invention, as well as the details of certain illustrative forms thereof, will be more fully understood from the following detailed description. Reference is had for purposes of description to the accompanying drawings, in which:

Fig. 1 is a sectional view illustrating a conduit, to the inner and outer surfaces of which my improved protective slabs are applied;

Fig. 2 is a sectional view showing the slabs to be applied to a concrete retaining wall;

Fig. 3 is a fragmentary perspective view showing the use of the slabs as applied to protected floor structures;

Fig. 4 is a transverse sectional view of a reinforced concrete pile or column, the protected exterior of which comprises a preformed concrete sleeve impregnated with asphalt;

Fig. 5 illustrates a typical form of horizontally extending joint that is particularly suitable where a bottom edge of one slab is to be joined to the top edge of the slab next below;

Figs. 6 and 7 illustrate typical forms of vertically extending joints;

Fig. 8 illustrates another type of joint particularly adaptable for use where the slabs are laid flat as in floor structures; and Fig. 9 illustrates a further variational form of joint for connecting preformed impregnated concrete pipe sections.

In Fig. 1 of the drawings, I show one form of the invention as embodied in conduits such as sewers, aqueducts and the like. The conduit may of course be of any desired shape in cross section, although as typical I have shown a conduit having a general oval shape, as is common in this class of pipes. The body 10 of the conduit is of concrete which may be comparatively dense and of little porosity to prevent seepage of water therethrough. In order to protect the interior surface of the concrete against the destructive action of agencies which may be present in the fluid carried by the conduit, the latter is formed with a series of impregnated concrete slabs, generally indicated at 11 covering its inner surface. While for purposes of simplifying the illustration, I have shown slabs to extend only half way around the interior of the conduit, it will be understood that these will be continued entirely around the inner surface. In the event the exterior of the conduit is to be subject to attack by concrete deteriorating agencies, the protective slabs may be applied to the outside of the conduit as indicated at 12. It will be understood of course that either one or both the inner and outside surfaces of the conduit may be protected by applying the impregnated slabs, in accordance with the conditions to which the conduit is subjected.

It will suffice to state at this point that the arrangements of slabs indicated at 11 and 12 comprise a series of individual slabs 13, the outer faces of which may together present a comparatively smooth surface, and the inner faces of which are formed with projections or irregularities as at 14 for the purposes of securely bonding the slabs to the concrete body 10 of the conduit. The particularities of the slab construction and treatment will be described more fully at a later point.

In forming the conduit, assuming it is desired to render the inner surface waterproof and resistant to acids, alkalies and the like, the slabs 13 are arranged and supported at the inside by suitable means, not shown, in conformity with the desired shape of the conduit, and before the main body 10 of concrete is poured. In cases where no necessity arises for protecting the outer surface of the conduit, suitable forms, not shown, may be built around the pre-arranged slabs 13 and in spaced relation therewith. The concrete 10 forming the body of the conduit may then be poured into the space between the inner arrangement of slabs 13 and the outside forms and after the concrete has hardened and set fully, the outside forms may be removed. It will thus be seen that in the operation of forming the conduit, the series of inner slabs 13 serve essentially as a permanent internal form. The individual slabs become securely bonded to the concrete 10 by virtue of the effective bonding surfaces presented by the projections 14 of the slabs. As will later appear, these projections preferably are shaped in the manner of undercut tongues or ribs between which the concrete 10 may flow to form essentially dovetail joints, the effectiveness of which in bonding the slabs to the concrete body, will be apparent.

In the event the impregnated slabs are to be applied only to the outside of the conduit, these may be supported in the arrangement desired and removable forms erected in spaced relation at the inside, and the concrete going to make up the body of the conduit, poured into the space between the pre-arranged outside slabs and the impermanent outside form. Where the slabs are to be applied to both the inside and outside of the conduit the slabs may be first arranged in spaced inner and outer series and the concrete poured in between them.

In Fig. 2 I show another form of the invention in which my improved protective slabs are applied to the faces of a concrete retaining wall or dam. Here the slabs are shown to be attached to both the forward and rear surfaces of the wall as at 16 and 17, the wall being built up by first arranging the two series of slabs in spaced relation and pouring the concrete in between them, and the slabs serving as forms for the concrete in the body of the wall. In building the wall, a removable form may of course be substituted for one series of slabs in case it is necessary to protect but one surface of the wall.

In Fig. 3 I show the bottom surface of a concrete floor 18 to be protected by the slabs 19 which, in forming the floor, are first laid in the positions indicated and with their undercut tongues projecting above, and the concrete poured on top of them. A beam 18a may be built into the floor by arranging the slabs 19a, 19b as shown and filling in between them with concrete.

In Fig. 4 I show another embodiment of the invention in the form of a protected concrete pile or column, in which the body or interior concrete and steel reenforcement, are protected by an outside layer of impregnated concrete. Here the protective layer comprises a preformed sleeve 22 of concrete interstitially impregnated with asphalt, the protective layer formed by the sleeve being thus preformed as an entity, as distinguished from the previously described protective layers in Figs. 1, 2 and 3, wherein individual preformed slabs are bonded together. In forming the pile, the sleeve 22 is placed about the reinforcing steel, herein shown typically as H-column 23, and the concrete 24 comprising the main body of the pile, poured in between the reinforcement 23 and the preformed sleeve. By virtue of the latter being impregnated with asphalt and thereby rendered waterproof and resistant to concrete deteriorating agencies, the body of the pile as well as the reinforcement, are effectively protected. I may state that this type of pile is particularly suitable for use in sea water, because of its ability to resist attack by the various materials present in sea water, which ordinarily destroy and weaken unprotected concrete piling in a comparatively short time.

The general type of impregnated slabs shown in Figs. 1, 2 and 3, is illustrated in detail in Fig. 8. The type of joint between the slabs may be of any of the forms hereinafter described, although for purposes of illustration I have shown, in Fig. 8, a joint particularly suitable for floor slabs in the arrangement shown in Fig. 3. The slabs 19 are formed, as previously mentioned, of concrete having sufficient porosity to permit their being penetrated to a substantial depth, if not entirely, with asphalt. The slabs are shaped to provide projecting tongues or ribs 19b having undercut edges 19c and forming dove-tail recesses at 25. Thus dove-tail joints are formed between the slabs and the concrete forming the body of the floor or wall, which is poured against the irregular surface of the slabs. Ordinarily, the concrete to which the slabs are bonded, will be of greater density and less porosity than the slabs, since it is desirable that the body of the structure have the greatest possible strength and that it be rendered impervious to fluids to the highest degree.

As mentioned earlier hereinabove the slabs may be impregnated in accordance with the process described in the Osborne Patent No. 1,383,749. According to this process, the concrete slab or member to be impregnated is heated to a temperature sufficient to remove the contained air, free water, and at least part of the water of combination of the concrete, and the interstitial spaces or pores then filled with asphalt.

When the slabs are placed flat as in the floor structure of Fig. 3, a type of joint generally indicated at 26 may be used, the character of this joint being such that the asphalt may be poured from above and retained within the joint space without appreciable leakage. The opposing ends of the slabs at the joint are shaped to provide an upper vertically extending space 27 of substantially uniform width, and an offset lower V-shaped space 28 which is closed at its lower end. The hot asphalt poured into the upper space 27 is permitted to entirely fill the joint without leakage below. And as will readily appear, the slabs are locked against being parted by shear at the joint, by virtue of the overlap had by the projecting ends of the slabs.

In Fig. 5 I show another type of joint to be used between the horizontally extending edges of the slabs, that is where the lower edge of one slab is to be joined to the top edge of the slab next below. Joints of this character may be used to advantage in connection with slabs as arranged in Fig. 2 and in the sides of the conduit shown in Fig. 1. The upper edge of the lower slab 29 is shaped to form a recess 29a, the width of the recess preferably being less than the width of the slab so as to leave flat end faces at 30. The lower edge of the upper slab 29 is shaped to form a projecting rib 31, which may correspond in shape to the recess 29a. In forming the joint the recess in the lower slab is entirely or partially filled with hot asphalt, and the upper slab then put in place so that some of the hot asphalt is displaced out of the recess into the spaces at 32 at the outside thereof.

The joint shown in Fig. 6 is designed particularly for use along vertically extending edges of the slabs, and is shaped to provide a space through which the asphalt may travel the full length of the joint after being poured into the joint at its upper end. Here the slabs 33 have oppositely projecting end portions 34 the inner edges of which are spaced apart to provide an opening at 35 extending the full length of the joint. Thus the hot asphalt when poured into the upper end of space 35, is permitted to flow down the length thereof, and to spread out between the opposing end faces of the slabs into the spaces at 36. The joint shown in Fig. 7 is generally similar to that of Fig. 6, but is used where the narrow portion 33a of a slab is to be joined to the comparatively wide end of one of the slabs 33. An enlarged asphalt passing space 38 is formed by beveling one corner 39 of the narrow width slab, the slabs coming substantially together at 40 and being spaced apart slightly at 41 to allow the asphalt to completely fill the joint.

In Fig. 9, I show a further variational form of joint in which the members to be bonded together, instead of comprising flat slabs, are in the form of concrete pipe sections impregnated with asphalt. The pipe sections 42 and 43 are formed, as in the case of the slabs, of more or less porous concrete and are first impregnated with asphalt. The space at 44 between sections 43 and the enlarged end 42a of section 42, is filled with jute, or other similar material capable of holding the joint asphalt. Hot asphalt is then poured into the open end of the joint space, the jute becoming saturated with the asphalt and serving to retain the latter in the joint, by permitting a sufficient amount of the asphalt to flow into the space 45 between the end faces of the pipe sections. Here, as in the previously described joints, the hot asphalt upon being poured into the joint space, melts the asphalt with which the members are impregnated at the joint surfaces, thereby combining with the impregnated asphalt to form, upon hardening, an extremely strong and deteriorant resisting joint.

I claim:

1. In structures of the character described, the combination comprising, a pair of preformed concrete members impregnated with waterproofing substance and joined together at adjacent edges, there being a space between said edges to accommodate a joint forming material, and said space being filled with material containing the substance with which said members are impregnated, said joint forming material being integrated with the substance with which said members are impregnated.

2. In structures of the character described, the combination comprising, a pair of preformed concrete members impregnated with asphalt and joined together along adjacent edges, there being a space between said edges to accommodate joint forming material, and said space being filled with a material containing asphalt, the asphalt in said joint forming material being integrated with the asphalt with which said members are impregnated.

3. In structures of the character described, the combination comprising, a pair of preformed concrete members impregnated with asphalt and joined together along adjacent edges, there being a space between said edges to accommodate joint forming material, and said space being filled with a material containing asphalt and silica, the asphalt in said joint forming material being integrated with the asphalt with which said members are impregnated.

4. In structures of the character described, the combination comprising, a pair of preformed concrete members impregnated with asphalt and joined together along adjacent edges, there being a space between said edges to accommodate joint forming material, and said space being filled with asphalt having a penetration of from 0 to 10 at 77° F., the asphalt in said joint forming material being integrated with the asphalt with which said members are impregnated.

5. In structures of the character described, the combination comprising, a pair of preformed concrete slabs impregnated with asphalt and joined together along adjacent edges, there being a space between said edges to accommodate joint forming material, and said space being filled with asphalt at a temperature above the melting point of the asphalt with which said slabs are impregnated.

6. In structures of the character described, the combination comprising, a concrete body, a pair of preformed concrete slabs impregnated with asphalt and physically bonded to said body, said slabs being joined together at adjacent edges and there being a space between said edges to accommodate joint forming material, and said spaces being filled with asphalt at a temperature above the melting point of the asphalt with which said slabs are impregnated.

7. In structures of the character described, the combination comprising, a concrete body, a pair of preformed concrete slabs impregnated with asphalt and having irregularly shaped surfaces adjacent and physically bonded to said body, said slabs being joined together at adjacent edges and there being a space between said edges to accommodate joint forming material, and said space being filled with asphalt at a temperature above the melting point of the asphalt with which said slabs are impregnated.

8. The method of forming a joint between spaced concrete members impregnated with waterproofing substance, that includes, pouring into the joint space heated waterproofing material and allowing said material to cool and harden in the joint space, said material, upon hardening, being integrated with the waterproofing substance with which said concrete members are impregnated.

9. The method of forming a joint between spaced concrete members impregnated with waterproofing substance, that includes, pouring into the joint space waterproofing material heated to a temperature above the melting point of the concrete impregnating substance, allowing said material to cool and harden in the joint space, said material, upon hardening, being integrated with the waterproofing substance with which said concrete members are impregnated.

10. The method of forming a joint between spaced concrete members impregnated with asphalt, that includes, pouring into the joint space asphalt heated to a temperature above the melting point of the asphalt with which said concrete members are impregnated, and allowing the asphalt to cool in the joint space and to integrate with the concrete impregnating asphalt.

11. In structures of the character described, the combination comprising, a pair of preformed porous members impregnated with waterproofing substance and joined together at adjacent edges, there being a space between said edges to accommodate a joint forming material, and said space being filled with waterproofing material, said joint forming material being integrated with the substance with which said members are impregnated.

12. In structures of the character described, the combination comprising, a pair of preformed porous members impregnated with asphalt and joined together along adjacent edges, there being a space between said edges to accommodate joint forming material, and said space being filled with material containing asphalt, the asphalt in said joint forming material being integrated with the asphalt with which said members are impregnated.

13. In structures of the character described, the combination comprising, a concrete body, a pair of preformed porous slabs impregnated with waterproofing substance and physically bonded to said body, said slabs being joined together at adjacent edges and there being a space between said edges to accommodate joint forming material, and said spaces being filled with waterproofing material at a temperature above the melting point of the substance with which said slabs are impregnated.

14. In structures of the character described, the combination comprising, a concrete body, a pair of preformed porous slabs impregnated with asphalt and having irregularly shaped surfaces adjacent and physically bonded to said body, said slabs being joined together at adjacent edges and there being a space between said edges to accommodate joint forming material, and said space being filled with asphalt at a temperature above the melting point of the asphalt with which said slabs are impregnated, the asphalt in said joint being substantially integrated with the asphalt with which said slabs are impregnated.

JOHN W. B. BLACKMAN.